(12) United States Patent
Worley, III et al.

(10) Patent No.: US 9,269,152 B1
(45) Date of Patent: Feb. 23, 2016

(54) OBJECT DETECTION WITH DISTRIBUTED SENSOR ARRAY

(75) Inventors: William Spencer Worley, III, Half Moon Bay, CA (US); Petr G. Shepelev, San Jose, CA (US); Edward Dietz Crump, Santa Cruz, CA (US); Robert W. Sjoberg, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 621 days.

(21) Appl. No.: 13/226,990

(22) Filed: Sep. 7, 2011

(51) Int. Cl.
 *G06T 7/00* (2006.01)
 *G06F 3/01* (2006.01)
 *G06T 19/00* (2011.01)

(52) U.S. Cl.
 CPC .............. *G06T 7/0073* (2013.01); *G06F 3/011* (2013.01); *A63F 2300/1093* (2013.01); *G06T 7/0046* (2013.01); *G06T 19/006* (2013.01); *G06T 2207/30196* (2013.01)

(58) Field of Classification Search
 None
 See application file for complete search history.

(56) References Cited

U.S. PATENT DOCUMENTS

| | | | | |
|---|---|---|---|---|
| 5,930,741 | A * | 7/1999 | Kramer | 463/49 |
| 6,323,942 | B1 * | 11/2001 | Bamji | 356/5.01 |
| 6,324,296 | B1 * | 11/2001 | McSheery et al. | G06T 7/0018 250/559.32 |
| 6,791,542 | B2 * | 9/2004 | Matusik et al. | 345/420 |
| 6,987,885 | B2 * | 1/2006 | Gonzalez-Banos et al. | 382/192 |
| 7,257,236 | B2 * | 8/2007 | Yukhin et al. | 382/154 |
| 7,285,047 | B2 * | 10/2007 | Gelb et al. | 345/419 |
| 7,418,392 | B1 | 8/2008 | Mozer et al. | |
| 7,720,683 | B1 | 5/2010 | Vermeulen et al. | |
| 7,774,204 | B2 | 8/2010 | Mozer et al. | |
| 8,044,996 | B2 * | 10/2011 | Rice et al. | 382/154 |
| 8,259,109 | B2 * | 9/2012 | El Dokor et al. | 345/424 |
| 8,462,199 | B2 * | 6/2013 | Givon | 348/49 |
| 2012/0188344 | A1 * | 7/2012 | Imai | 348/262 |
| 2012/0223885 | A1 | 9/2012 | Perez | |

FOREIGN PATENT DOCUMENTS

WO  WO2011088053 A2  7/2011

OTHER PUBLICATIONS

Allard, Jérémie, et al. "The Grimage Platform: A Mixed Reality Environment for Interactions" Proceedings of Fourth IEEE Int'l Conf. on Computer Vision Systems (2006).*
Cheung, Kong Man "Visual Hull Construction, Alignment and Refinement for Human Kinematic Modeling, Motion Tracking and Rendering" PhD Thesis, Carnegie Mellon University (2003).*
Zhang, Zhengyou "Flexible Camera Calibration by Viewing a Plane From Unknown Orientations" Proceedings of the 7th IEEE Int'l Conf. on Computer Vision, pp. 666-673 (1999).*
Mundermann, Lars, et al. "Accurately measuring human movement using articulated ICP with soft-joint constraints and a repository of articulated models" IEEE Computer Vision and Pattern Recognition, pp. 1-6 (2007).*

(Continued)

*Primary Examiner* — Kamini S Shah
*Assistant Examiner* — Jay B Hann
(74) *Attorney, Agent, or Firm* — Lee & Hayes, PLLC

(57) ABSTRACT

Objects within a scene are modeled in two- or three-dimensions by acquiring slices of data from a distributed sensor array and generating the model of the object at least in part from those slices. The distributed sensor array may comprise optical transmitters and optical receivers configured such that they may be individually addressed and activated. The system described herein may be used to support an augmented reality environment.

31 Claims, 10 Drawing Sheets

(56) References Cited

OTHER PUBLICATIONS

Ercan, A. O., et al. "Camera Network Node Selection for Target Localization in the Presence of Occlusions" Proceedings of the ACM SenSys Workshop on Distributed Smart Cameras (2006) available at <http://eresearch.ozyegin.edu.tr/xmlui/bitstream/handle/10679/87/dsc06.pdf>.*

Raskar, Ramesh, et al. "Prakash: Lighting Aware Motion Capture Using Photosensing Markers and Multiplexed Illuminators" ACD Transactions on Graphics, vol. 26, No. 3, article 36 (2007).*

Pinhanez, "The Everywhere Displays Projector: A Device to Create Ubiquitous Graphical Interfaces", IBM Thomas Watson Research Center, Ubicomp 2001, 18 pages.

* cited by examiner

| Slice 702 | Emitter 704 | Intensity (at receiver) 706 | | | | | | | |
|---|---|---|---|---|---|---|---|---|---|
| | | 1 | 2 | 3 | 4 | 5 | 6 | 7 | 8 |
| 1 | C | 92 | 98 | 100 | 0 | 0 | 0 | 64 | 54 | ... |
| ... | ... | | | | | | | | |
| 6 | H | 0 | 50 | 59 | 70 | 81 | 91 | 98 | 100 |

FIG. 7

OBJECT DETECTION WITH DISTRIBUTED SENSOR ARRAY

BACKGROUND

Object detection and modeling is useful in a variety of applications ranging from biophysical modeling, surveillance, computer-generated imagery, to augmented reality. Augmented reality environments enable interaction between real and virtual objects. Such detection and modeling may prove challenging in complex real-world environments with many objects exhibiting complicated motions.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 7 illustrates a table containing slice data.

DETAILED DESCRIPTION

Augmented reality environments allow tangible real-world and virtual or computer generated objects to interact. These augmented reality environments benefit from data about the three-dimensional shape and position of objects therein. This data may be used to determine gestures for input, placement of objects for presenting data via a projector, and so forth. Described herein are devices and techniques for generating a two- or three-dimensional model of objects within the augmented reality environment using a distributed sensor array.

The distributed sensor array comprises a plurality of optical transmitters and optical receivers. The optical transmitters and receivers are individually addressable and configured to be activated on command. When emplaced in the environment such as around the perimeter of a room, the distributed sensor array is configured to selectively illuminate a subset of the optical transmitters. For example, one optical transmitter may be activated. During illumination, the optical receivers acquire intensity data, forming a slice of information. This slice may comprise the intensity data, information about the optical transmitter which generated the illumination, information about the optical receiver which received the signal, and position of the transmitter and receiver. After acquiring a series of slices in which the illuminating optical transmitter, and thus position of the signal, is varied, a model of the scene may be generated.

The distributed sensor array allows for a relatively low-cost system to rapidly model objects within a volume. The distributed sensor array may be permanently mounted or may be deployed in an ad-hoc manner, such as a string of sensors hung around a room as illustrated and described below. This ability to easily deploy the sensor array allows for portable or temporary deployments of augmented reality environments. Furthermore, non-imaging optical receivers may be utilized that are thus resistant to optical or electronic interference. When combined with the high scan rates available, high resolution multi-dimensional models of objects within a scene may be readily generated as described herein.

Illustrative Environment

Figure 1:
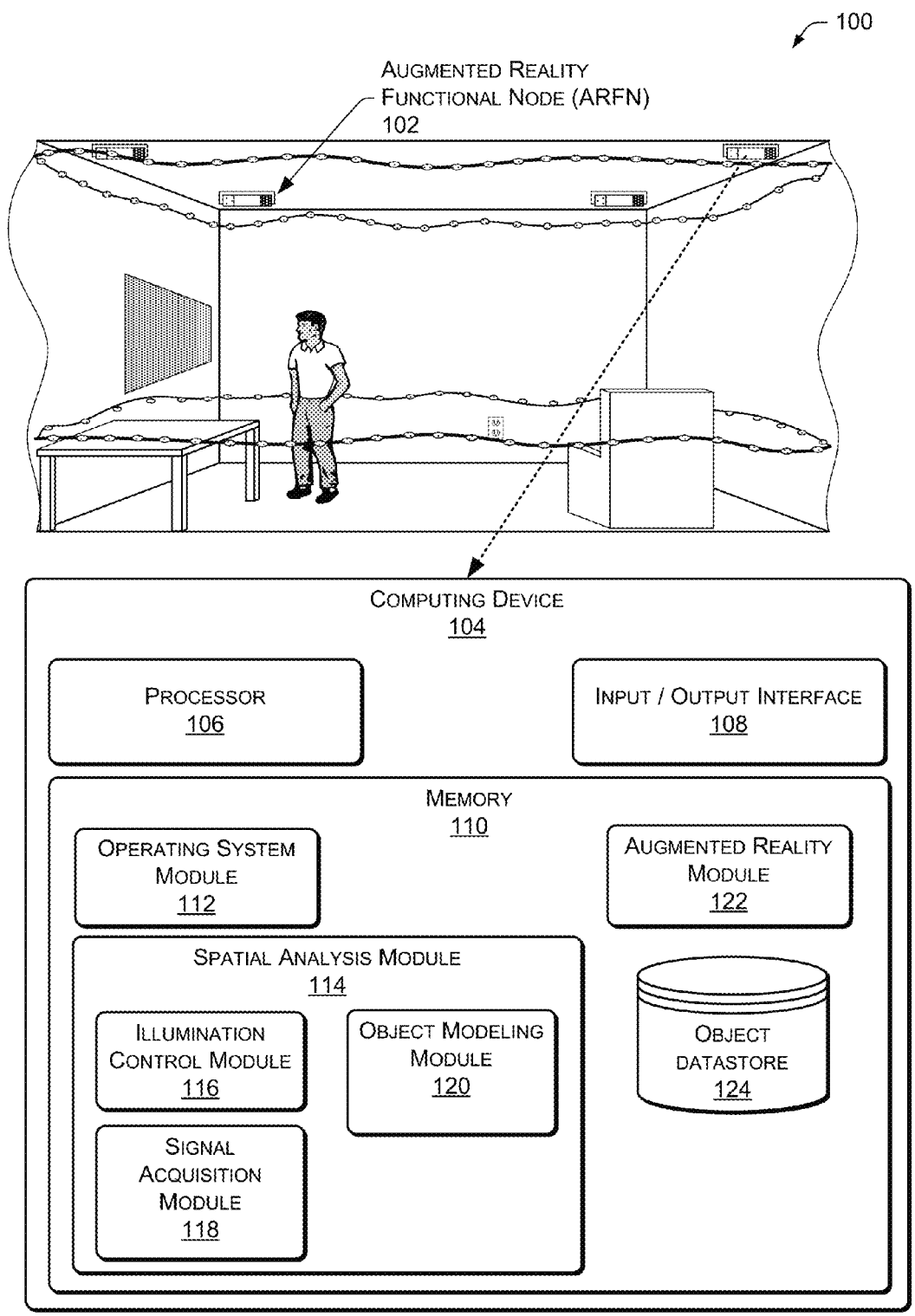
FIG. 1 shows an illustrative scene within an augmented reality environment that includes an augmented reality functional node with associated computing device and spatial analysis module configured to acquire data from a distributed sensor array.

FIG. 1 shows an illustrative augmented reality environment 100 that includes an augmented reality functional node (ARFN) 102 with associated computing device. One or more ARFNs 102 may be positioned on the ceiling of the room. In other implementations, the ARFN 102(s) may be positioned in other locations within the scene, such as on walls, in lamp fixtures, on tables, and so forth. When active, the ARFN 102 may generate an augmented reality environment incorporating the scene. In some implementations, more or fewer ARFNs 102 may be used.

The ARFN 102 is coupled to a computing device 104. This computing device 104 may be within the ARFN 102, or placed at another location and connected to the ARFN 102. The computing device 104 comprises a processor 106, an input/output interface 108, and a memory 110. The processor 106 may comprise one or more processors configured to execute instructions. The instructions may be stored in memory 110, or in other memory accessible to the processor 106.

The input/output interface 108 may be configured to couple the computing device 104 to other components such as projector, cameras, microphones, other ARFNs 102, a distributed sensor array, other computing devices, and so forth. The coupling between the computing device 104 and the devices may be via wire, fiber optic cable, or wireless connection.

The memory 110 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

Several modules such as instructions, datastores, and so forth may be stored within the memory 110 and configured to execute on a processor, such as the processor 106. An operating system module 112 is configured to manage hardware and services within and coupled to the computing device 104 for the benefit of other modules. Modules may be stored in the memory of the ARFN 102, storage devices accessible on the local network, or cloud storage accessible via a wide area network.

A spatial analysis module 114 is configured to perform several functions which may include analyzing a scene to generate a topology, recognizing objects in the scene, dimensioning the objects, modeling the scene, and so forth. Modeling may be facilitated using several technologies including structured light, light detection and ranging (LIDAR), optical time-of-flight, stereoscopic imaging, radar, modeling using the distributed sensor array, and so forth either alone or in combination with one another. For convenience, and not by way of limitation, the examples in this disclosure refer to modeling using data from the distributed sensor array. The spatial analysis module 114 may also receive data from other input and output components, such as described below with regards to FIG. 2.

The spatial analysis module 114 may include an illumination control module 116 configured to selectively illuminate optical transmitters in the distributed sensor array. A signal acquisition module 118 is configured to recover data from the distributed sensor array while an optical transmitter is generating a signal. A slice of data comprises a set of data associated with a particular illumination state. This slice may comprise the intensity data, information about the optical transmitter which generated the illumination, information about the optical receiver which received the signal, and position of the transmitter and receiver. An object modeling module 120 is configured to use a plurality of slices to generate a model of the scene. In some implementations the object modeling module 120 may process the slices using a projection-slice theorem, volume intersection methods, visual hull generation techniques including those by Aldo Laurentini, shape-from-silhouette techniques, and so forth.

An augmented reality module 122 is configured to generate augmented reality output in concert with the physical environment. The augmented reality module 122 may access input/output devices within one or more ARFN nodes 102 to generate output, receive input, or both and may be configured to identify objects within the scene, track their position, and accept gestures as inputs. The augmented reality module 122 may utilize data obtained by the spatial analysis module 114.

An object datastore 124 in the memory 110 is configured to maintain information about objects within the scene. This information may be acquired from the ARFN 102, other input devices, or via manual input. The object datastore 116 may be stored on one or more of the memory of the ARFN 102, storage devices accessible on the local network, or cloud storage accessible via a wide area network. As used in this disclosure, datastore includes lists, arrays, databases, and other data structures used to provide storage and retrieval of data.

Figure 2:
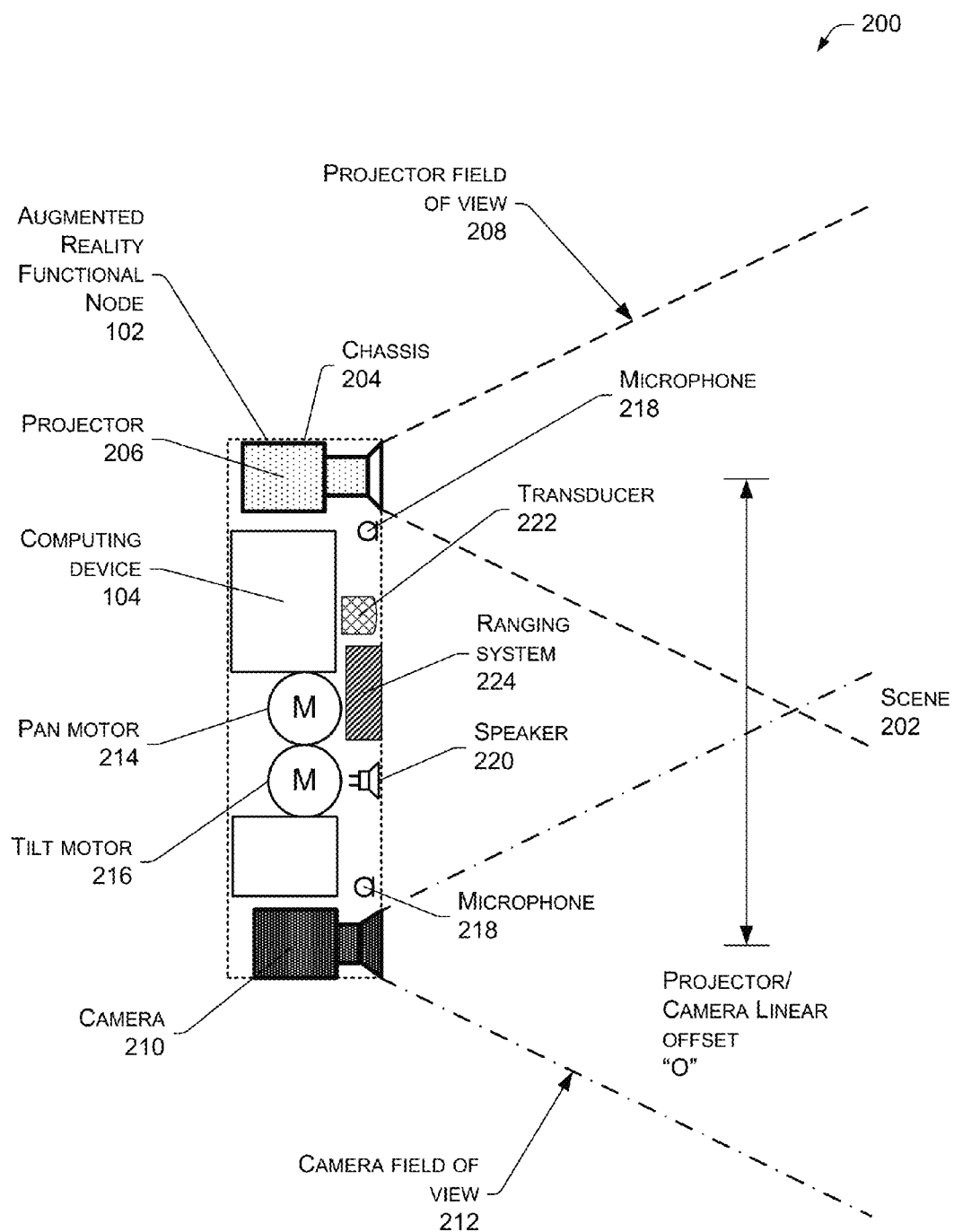
FIG. 2 shows an illustrative augmented reality functional node and selected components.

FIG. 2 shows an illustrative schematic 200 of the augmented reality functional node 102 and selected components. The ARFN node 102 is configured to scan at least a portion of a scene 202 and the objects therein. The ARFN 102 may also be configured to provide output.

A chassis 204 is configured to hold the components of the ARFN 102. Within the chassis may be placed a projector 206. The projector 206 is configured to generate images. These images may be visible light images perceptible to the user, visible light images imperceptible to the user, images with non-visible light, or a combination thereof. This projector 206 may comprise a digital micromirror device (DMD), liquid crystal on silicon display (LCOS), liquid crystal display, 3LCD, and so forth configured to generate an image and project it onto a surface within the environment. This image may in some implementations comprise structured light, which may be used to characterize objects in the scene, provide data to aid in modeling objects in the scene, and so forth. In some implementations other display devices may be used in place of or in addition to the projector 206. These display devices may include emissive, reflective, or other display technologies suitable for presenting electronically generated visual information such as bitmaps, raster graphics, and so forth to a user.

The projector 206 has a projector field of view 208 which describes a particular solid angle. The projector field of view 208 may vary according to changes in the configuration of the projector. For example, the projector field of view 208 may narrow upon application of an optical zoom to the projector. In some implementations a plurality of projectors 206 may be used.

A camera 210 or other imager may also be placed within the chassis 204. The camera 210 is configured to image the scene in visible light spectral band, non-visible light spectral bands, or both. The camera 210 has a camera field of view 212 which describes a particular solid angle. The camera field of view 212 may vary according to changes in the configuration of the camera 210. For example, an optical zoom of the camera may narrow the camera field of view 212. In some implementations a plurality of cameras 210 may be used.

The chassis 204 may be mounted with a fixed orientation, or be coupled via an actuator to a fixture such that the chassis 204 may move. Actuators may include piezoelectric actuators, motors, linear actuators, and other devices configured to displace or move the chassis 204 or components therein such as the projector 206 and/or the camera 210. The actuator may comprise a pan motor 214, tilt motor 216, and so forth. The pan motor 214 is configured to move the chassis 204 in a yawing motion. The tilt motor 216 is configured to change the pitch of the chassis 204. In some implementations the roll of the chassis 204 may be altered as well. By panning, tilting, and/or rolling the chassis 204, different views of the scene may be acquired. The spatial analysis module 114 may use the different views to monitor objects within the environment.

One or more microphones 218 may be placed within the chassis 204, or elsewhere within the scene. These microphones 218 may be used to acquire input from the user, for echolocation, location determination of a sound, or to otherwise aid in the characterization of and receipt of input from the scene. For example, the user may make a particular noise such as a tap on a wall or snap of the fingers which are pre-designated as inputs within the augmented reality environment. The user may alternatively use voice commands.

One or more speakers 220 may also be present to provide for audible output. For example, the speakers 220 may be used to provide output from a text-to-speech module or to playback pre-recorded audio.

A transducer 222 may be present within the ARFN 102, or elsewhere within the environment, and configured to detect and/or generate inaudible signals, such as infrasound or ultrasound. These inaudible signals may be used to provide for signaling between accessory devices and the ARFN 102.

A ranging system 224 may also be provided in the ARFN 102. The ranging system 224 is configured to provide distance information from the ARFN 102 to a scanned object or set of objects. The ranging system 224 may comprise radar, light detection and ranging (LIDAR), ultrasonic ranging, stereoscopic ranging, and so forth. In some implementations the transducer 222, the microphones 218, the speaker 220, or a combination thereof may be configured to use echolocation or echo-ranging to determine distance and spatial characteristics.

In this illustration, the computing device 104 is shown within the chassis 204. However, in other implementations all or a portion of the computing device 104 may be placed in another location and coupled to the ARFN 102. This coupling may occur via wire, fiber optic cable, wirelessly, or a combination thereof. Furthermore, additional resources external to the ARFN 102 may be accessed, such as resources in another ARFN 102 accessible via a local area network, cloud resources accessible via a wide area network connection, or a combination thereof.

Also shown in this illustration is a projector/camera linear offset designated "O". This is a linear distance between the projector 206 and the camera 210. Placement of the projector 206 and the camera 210 at distance "O" from one another aids in the recovery of structured light data from the scene. The known projector/camera linear offset "O" may also be used to calculate distances, dimensioning, and otherwise aid in the characterization of objects within the scene 202. In other implementations the relative angle and size of the projector field of view 208 and camera field of view 212 may vary. Also, the angle of the projector 206 and the camera 210 relative to the chassis 204 may vary.

In other implementations the components of the ARFN 102 may be distributed in one or more locations within the environment 100. As mentioned above, microphones 218 and speakers 220 may be distributed throughout the scene. The projector 206 and the camera 210 may also be located in separate chassis 204. The ARFN 102 may also include discrete portable signaling devices used by users to issue inputs. For example, these may be acoustic clickers (audible or ultrasonic), electronic signaling devices such as infrared emitters, radio transmitters, and so forth.

Figure 3:
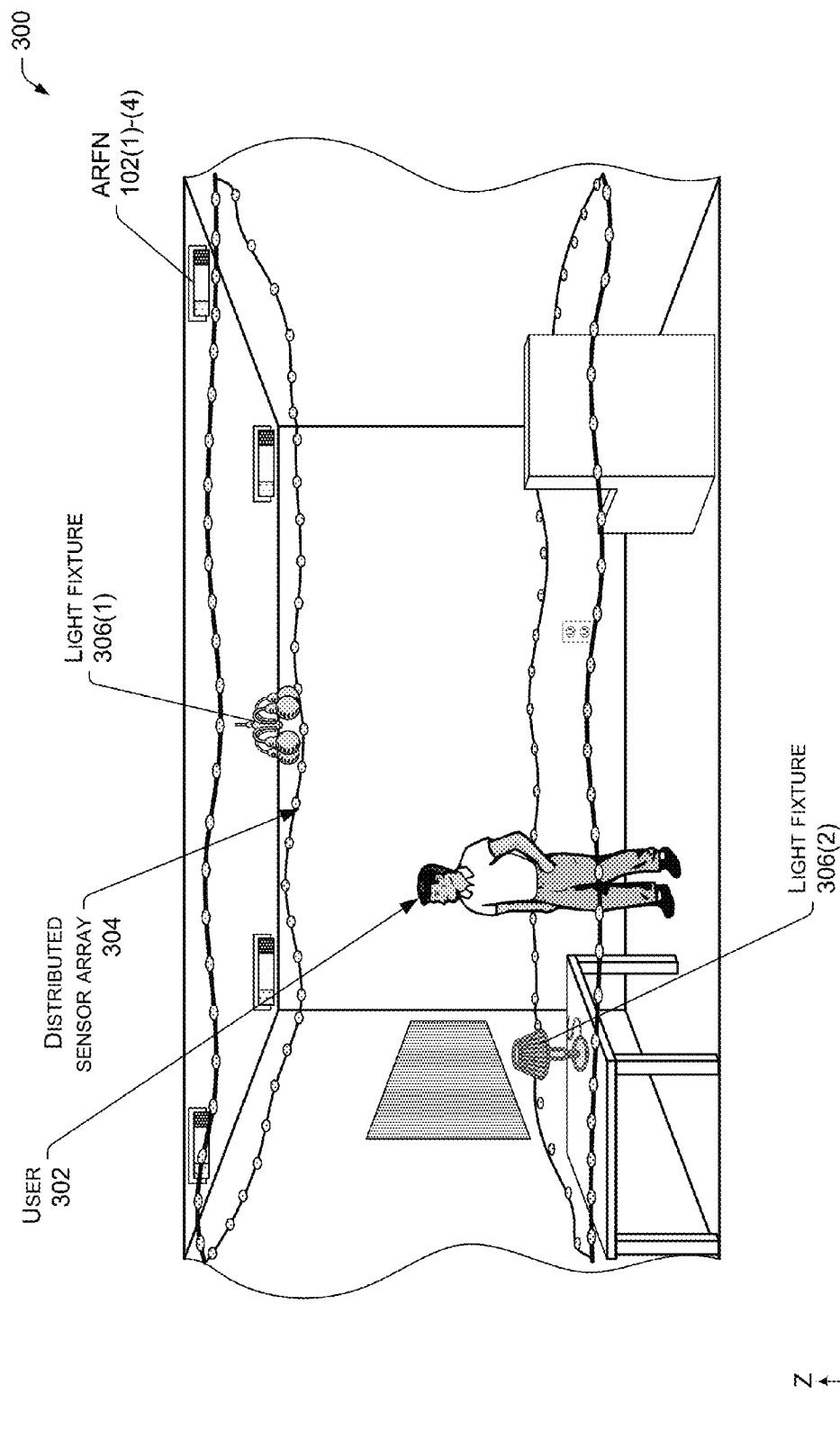
FIG. 3 illustrates an augmented reality environment including a distributed sensor array.

FIG. 3 illustrates elements 300 of the augmented reality environment including a distributed sensor array. As described above, the augmented reality environment may be maintained by ARFNs 102, such as shown here placed on the ceiling. This scene depicts a user 302 standing in a room. Distributed around the perimeter of the room at about waist-height and adjacent to the ceiling is a distributed sensor array 304 which may be coupled wired or wirelessly to the computing device 104, or ARFN 102.

In this illustration the distributed sensor array 304 is shown as a linear array, distributed spatially around the room. The array may be emplaced such that a first portion of the array 304 is visible to a second portion of the distributed sensor array 304. For example, as shown here the portion of the distributed sensor array 304 on one wall is visible to a portion on another wall.

The distributed sensor array 304 may contain elements that are part of a flexible, semi-flexible, or rigid structure. For example, in one implementation the distributed sensor array 304 may comprise a linear "string", while in another implementation the distributed sensor array 304 may comprise a rigid grid.

The distributed sensor array 304 may be configured to be statically mounted, or may be configured to move. For example, as shown here the distributed sensor array 304 is statically mounted to the walls and ceiling. In some implementations at least a portion of the distributed sensor array 304 may be configured to move such as in response to a linear actuator or motor. For example, a portion of the distributed sensory array 304 along one wall may be configured to shift along the wall, allowing acquisition of data from different locations.

The augmented reality environment may also include light fixtures 306. These light fixtures 306 may be mounted on the ceilings, walls, floor stands, and so forth. For example, as shown here an overhead light fixture 306(1) is positioned on the ceiling while a lamp light fixture 306(2) is on a table. The light fixtures 306 may be configured in some implementations to generate light suitable for use by the distributed sensor array 304. For example, the light fixture 306 may comprise a light emitting diode light source which can be configured to produce light at particular times, in particular spectral bands, and so forth. In this implementation the distributed sensor array 304 may be configured to use the light from one or more light fixtures 306 during operation as the sole source of illumination or in conjunction with one or more optical transmitters in the distributed sensor array 304. These light fixtures 306 may be configured to provide general illumination to the room or a portion thereof.

In some implementations an object may be detected by one or more of the sensors within the ARFN 102. Upon such detection the distributed sensor array 304 may be configured to direct the distributed sensor array 304 to scan a location associated with the detected object. For example, the ranging system 224 may detect the presence of an object and the distributed sensor array 304 may be used to characterize the shape of the object. Information about the object may also be used to increase a scanning frequency of the distributed sensor array 304, or otherwise alter characteristics of the scan. For example, continuing the example, an indication by the ranging system 224 that the detected object is in motion may result in an increased scan rate.

In another implementation, a detection by the distributed sensor array 304 may initiate data collection by one or more of the sensors in the ARFN 102. For example, detection of the object by the distributed sensor array 304 may result in the ARFN 102 directing the camera 210 towards the object to acquire an image of the object. The image may then be used to aid in object recognition and characterization.

Figure 4:
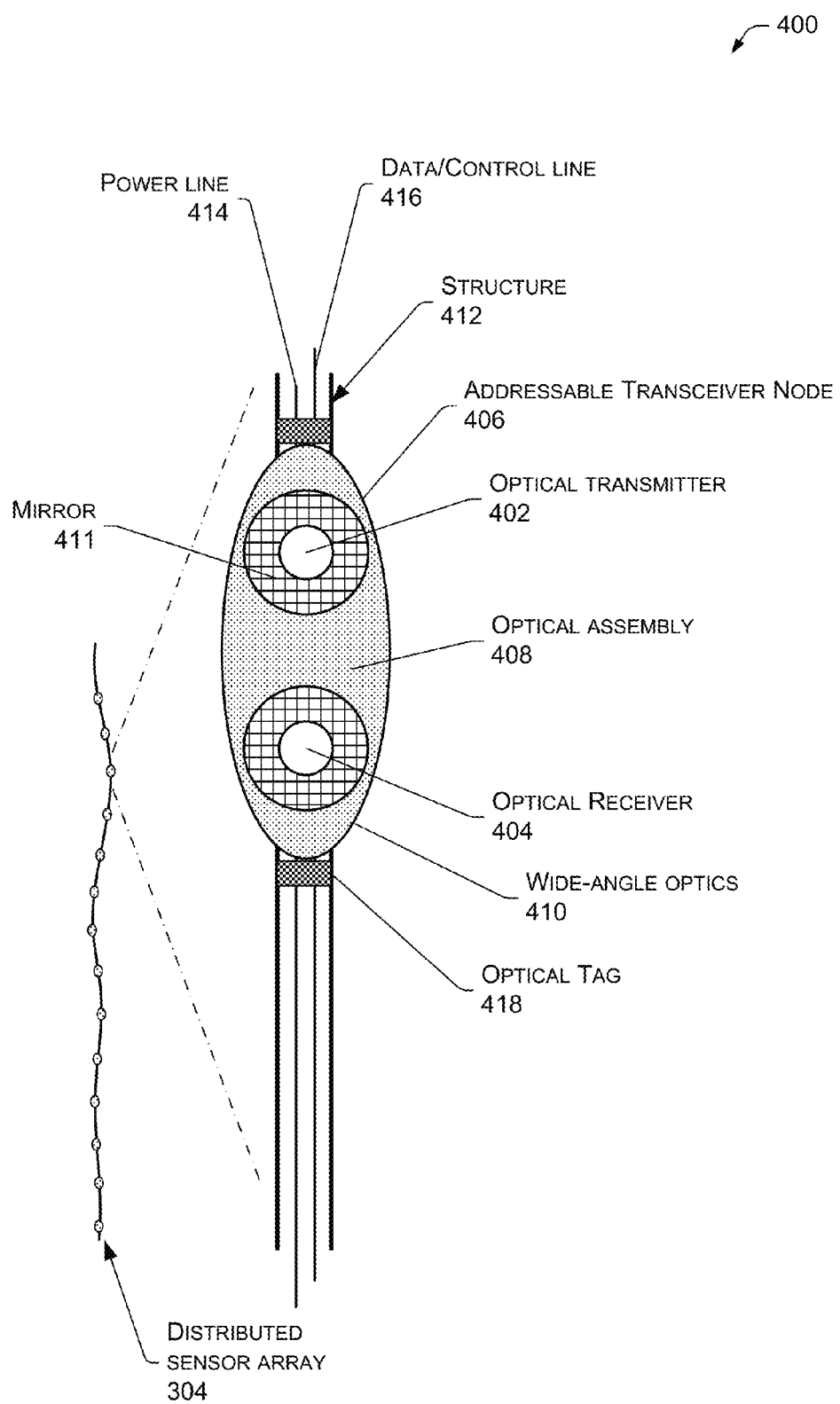
FIG. 4 illustrates an enlargement of a portion of the distributed sensor array.

FIG. 4 illustrates an enlargement 400 of a portion of the distributed sensor array 304. The distributed sensor array 304 comprises a plurality of optical transmitters 402 and optical receivers 404. In some implementations in an addressable transceiver node 406 the transmitter 402 and receiver 404 may be combined into an optical assembly 408.

The optical transmitters 402 are configured to generate an optical signal when activated. This optical signal may be in one or more spectral bands including infrared, visible, and ultraviolet. As used herein, the term spectral band indicates a frequency or range of frequencies. The optical transmitter 402 comprises a photon source such as a light emitting diode (LED), electroluminescent element, incandescent bulb, laser, fluorescent source, and so forth. The optical transmitter 402 is configurable to switch on and off, or otherwise generate a modulated output. This modulation may include changes in duration, frequency, phase, polarization, and so forth.

Visible light may be used to generate the slices as described below with regards to FIG. 5. In such an implementation, the modulation of the optical transmitters 402 may be configured such that a desired perceived level of illumination by the user results. For example, where the optical transmitters 402 are modulated such that they are illuminated more than 120 times per second, due to the relatively long integration time of the human eye they may appear to be continuously illuminated. As a result, the distributed sensor array 304 may also be configured to provide lighting to the room, or a portion thereof.

The optical receivers 404 are configured to detect the optical signal produced by the optical transmitters 402. For example, the optical receivers 404 may comprise photoresistors, photodiodes, phototransistors, charge-coupled detectors, complementary metal oxide semiconductor detectors (CMOS), reverse-biased light-emitting diodes, and so forth. The optical receivers 404 are configured to receive the optical signal and generate a detectable output. The optical receivers 404 in some implementations are non-imaging detectors.

As used herein, non-imaging indicates that the optical path is anidolic such that an image of the source is not necessarily formed, or if found, not recovered. For example, a photosensor with a single junction is a non-imaging sensor. In some implementations a linear CMOS sensor is a non-imaging sensor. In contrast, an imaging sensor has at least a two-dimensional array of sensors and is configured to generate an image such as a bitmapped photograph.

In some implementations the optical receivers 404 may be configured to selectively respond to the optical signal produced by the optical transmitters 402 and exclude or attenuate other signals or noise. For example, the optical receivers 404 may be configured to respond to the particular wavelength generated by the optical transmitters 402.

The optical assembly 408 in the addressable transceiver node 406 may include wide-angle optics 410. These wide-angle optics are configured to provide a wide field of view of optical signals as they are transmitted or received. For example, in one implementation, the wide-angle optics 410 may be configured to provide a wide-angle field of view of at least four steradians.

In another implementation, the optical assembly 408 may comprise one or more mirrors 411. These mirrors 411 may be statically or dynamically positioned to direct light to and from active optical elements such as the optical transmitter 402 and optical receiver 404. These active optical elements may be may be positioned in different addressable transceiver nodes 406. For example, the mirrors 411 may be configured to reflect light from one addressable transceiver node 406 to another. Statically positioned mirrors are fixed in place, while dynamic mirrors are configurable to move or otherwise alter path of light to and from active optical elements. For example, in one implementation the dynamic mirrors may comprise a micro-electromechanical system (MEMS) having an array of actuable mirrors. The mirrors 411 may be planar, concave, convex, spherical, parabolic, dichroic, asymmetrical, and so forth. In some implementations other optical devices may be used, such as retroreflectors. For example, instead of, or in addition to the mirrors 411, a set of retroreflectors (also known as corner reflectors) may be disposed in the addressable transceiver node 406.

While the mirrors 411 are depicted here around the active optical devices, in some implementations the mirrors 411 may be distributed elsewhere in the distributed sensor array 304. For example, the mirrors 411 may be positioned between the active optical devices of a particular addressable transceiver node 406. In another example, the mirrors 411 may be emplaced along at least a portion of the structure 412, on the optical tag 418, and so forth.

The addressable transceiver node 406 may be affixed to a structure 412. This structure may be flexible, semi-flexible, rigid, or a combination thereof. The structure 412 provides a mounting point for the addressable transceiver nodes 406 and may also carry power lines 414, data/control lines 416, and so forth. The structure 412 may be a discrete unit, such as a string of nodes 406, or may be integrated with, built into, or otherwise comprise a wall, ceiling, floor, table, or other object. In another implementation, the addressable transceiver node may comprise discrete units which are wirelessly coupled to the computing device 104.

The addressable transceiver node 406 is addressable in several ways. The optical transmitter 402 in a particular node 406 may be configured to activate and generate an optical signal. For example, in some implementations a subset of optical transmitters 402 in the distributed array 304 are configured to illuminate. This subset may be a single optical transmitter 402, or a group of optical transmitters 402.

In some implementations the optical transmitter 402 and the optical receiver 404 may be placed in separate enclosures, separate locations, and so forth. For example, a set of optical transmitters 402 may be distributed along a first rod, while a set of optical receivers 404 are distributed along a second rod. The rods are configured such that the optical receivers 404 are capable of receiving signals from at least a portion of the optical transmitters 402.

The distributed sensor array 304 may also comprise fiber optic or waveguide elements. For example, the optical output and received signals may be delivered to discrete points within the array via fiber optics.

The distributed sensor array 304 may also include other sensors. For example, microphones may be present along the array to provide for spatially distributed acoustic signal capture.

One or more optical tags 418 may be provided in the distributed sensor array 304. For example, as shown here optical tags 418 may be placed on both sides of the addressable transceiver node 406. These tags may be detected by the camera 210. Once detected, the position of the addressable transceiver node 406 within the room may be determined.

Figure 5:
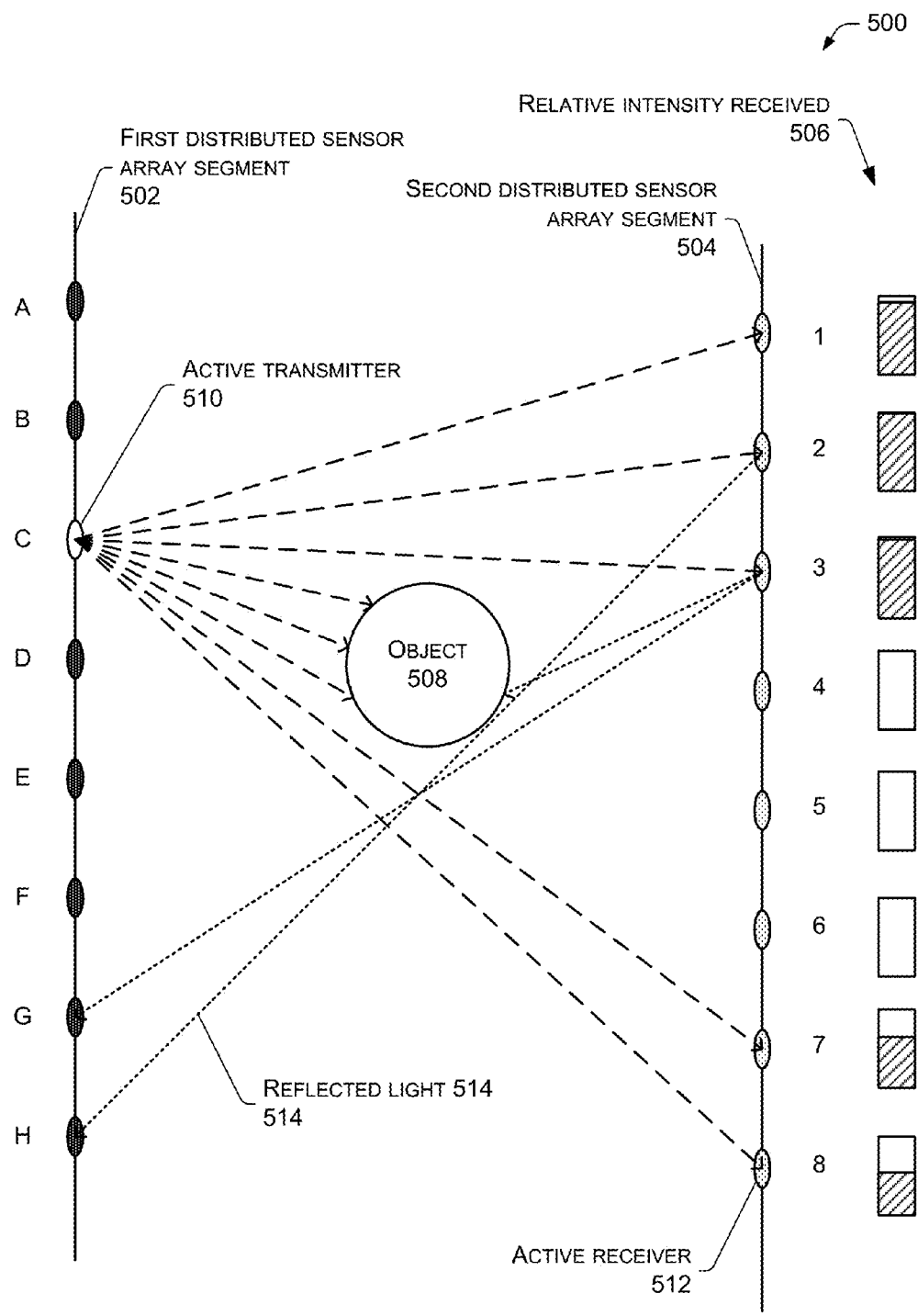
FIG. 5 illustrates acquisition of a first slice of the scene.

FIG. 5 illustrates acquisition 500 of a first slice of the scene. This illustration is a plan-view of the room, looking down. On the left of the scene is a first distributed sensor array segment 502, while on the right is a second distributed sensor array segment 504. While these segments are shown parallel to one another, in some implementations they may have other orientations relative to one another, such as forming an acute or obtuse angle. In this illustration, the first distributed sensor array segment 502 is configured to selectively emit optical signals while the second distributed sensor array segment 504 is configured to receive these signals. The signals may be received as a one-dimensional intensity value in some implementations. This intensity value may be indicative of modification of the emitted optical signals by interaction with an object or unmodified after bypassing the object.

In this illustration, a graph indicates the relative intensity received 506 at each of the optical receivers 404. This intensity may be absolute or relative to the highest intensity signal received, for example. The intensity of the signal received may vary according to various physical laws, such as an inverse square relationship. The intensity of the illumination optical signal is affected by interference or diffraction of light by the object.

In this example, an object 508 resides between the first distributed sensor array segment 502 and the second distributed sensor array segment 504. An active transmitter 510 is shown, emitting an optical signal from the optical transmitter 402 within the addressable transceiver node 406 designated "C" in this illustration. The light rays emitted from the optical transmitter 402 are affected by the object 508. The active receivers 512 include those designated 1-8 in the illustration. In some situations the light rays may reflect, diffract, or otherwise interact with the object 508. However, these light rays are configured to be in a spectral band which is substantially absorbed, substantially reflected, or both from the object. In other words, the light is free from producing substantial penetration of the object. For example, the spectral band may include long infrared which may penetrate up to a few centimeters of an organic object, but would not under typical usage and intensities penetrate bone. The intensity in some instances may be zero, such as where the optical receiver 404 is completely shadowed by the object. For example, as shown here at optical receivers 402 labeled 4, 5, and 6 the optical receivers 404 provide an intensity reading of zero.

The optical transmitters 402 may be rapidly switched on and off, and the optical receivers 404 are able to detect the signals generated during the active periods. The active transmitter 510 may thus be rapidly shifted and a series of slices of data may be acquired. This shift may be sequential, such as addressable transceiver nodes 406 A, B, C, D, E, F, . . . or may be non-sequential or grouped, such as A and D, B and E, and so forth. Where multiple optical transmitters 402 are active at substantially the same time, their output may be modulated to allow each transmitted signal to be identified at the receiver. This modulation may include pulse modulation, frequency modulation, phase, polarization, and so forth. As a result, in some implementations a plurality of image slices may be acquired at substantially the same time. As mentioned above with regards to FIG. 3, in some implementations at least a portion of these optical transmitters 402 may comprise light fixtures 306. These light fixtures 306 may be configurable to provide general illumination in addition to optical signals for the distributed sensor array 304.

In some implementations the sensors may include mirrors 411, and these mirrors 411 may be configured to direct light from their proximate addressable transceiver node 406 or from another addressable transceiver node 406. By using mirrors 411 to direct light, additional rays with different angles relative to the scene being scanned may be generated. The mirrors 411 may reflect light to one or more optical receivers. These additional rays may improve recovery of the shape of the object being scanned, increase resolution, and so forth. For example, optical receivers 2 and 3 may have mirrors 411 configurable to reflect a portion of the light emitted by optical transmitter C back towards nodes F, G, and H as shown here with rays of reflected light 514. The nodes F, G, and H may be configured to receive this light via their optical receivers 404. As shown here, the reflected light 514 further helps define the shape of the object 508. By increasing the number of rays and the paths they take with the mirrors 411, resolution and determination of the object's shape and position may be improved.

Figure 6:
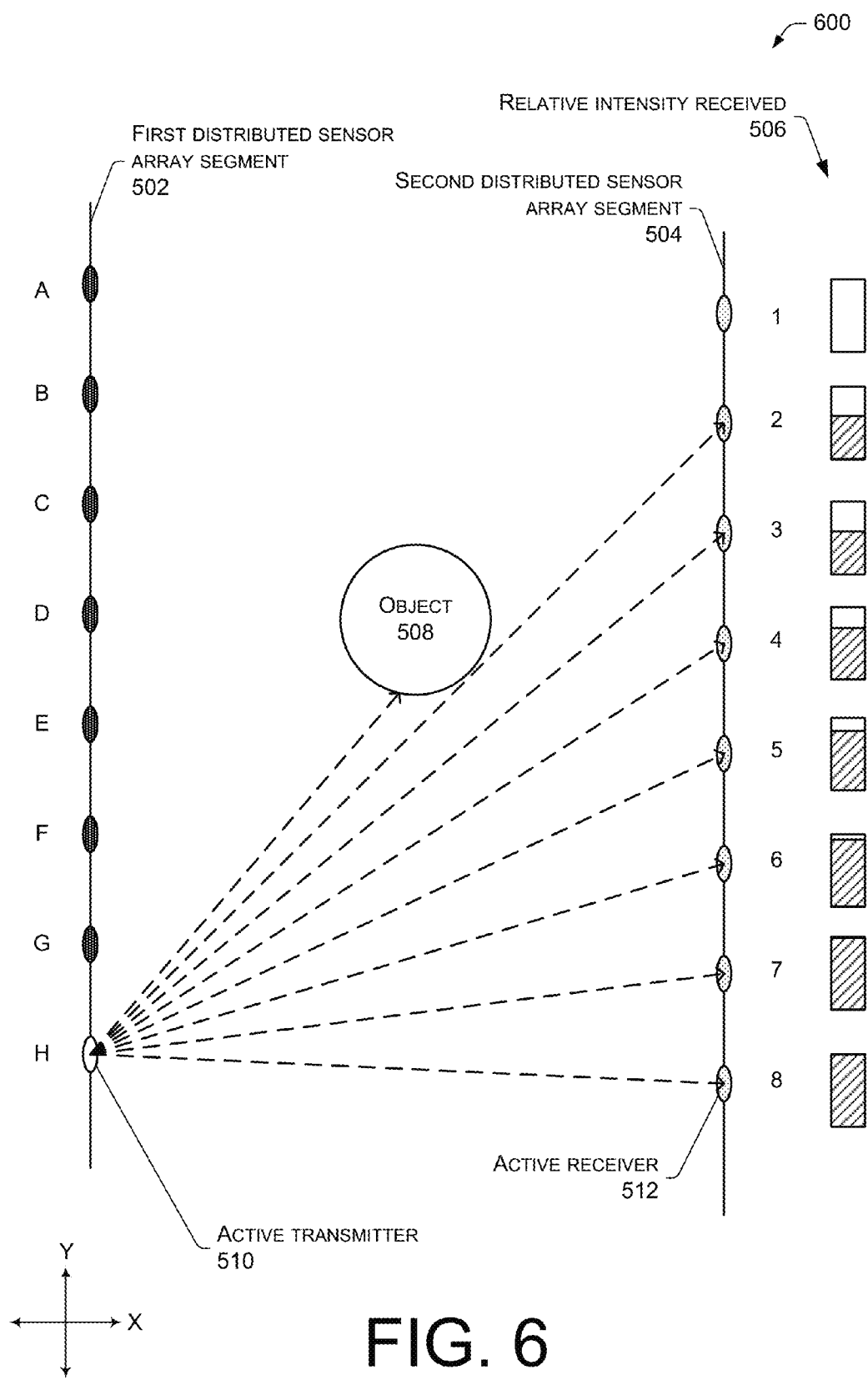
FIG. 6 illustrates acquisition of a second slice of the scene.

Continuing the example of FIG. 5, FIG. 6 illustrates acquisition 600 of a second slice of the scene. In this illustration, the active transmitter 510 is now the optical transmitter 402 in the addressable transceiver node 406 designated as "H". As shown here, due to the change in position of the active transmitter 510, different relative intensities 506 are received at the active receivers 512 in the second distributed sensor array segment 504.

By taking a plurality of slices of the scene, the spatial analysis module 114 may build up a two- or three-dimensional model of the object 508 in the scene. This model may be built using several techniques including the projection-slice theorem, volume intersection methods, visual hull generation techniques including those by Aldo Laurentini, shape-from-silhouette techniques, and so forth.

FIG. 7 illustrates a table 700 containing slice data as shown above in FIGS. 5-6. As shown here, a slice 702 comprises the combination of one or more given emitters 704 and intensity 706 at a plurality of receivers. In some implementations other data may be acquired, such as phase, polarization, reflectivity, and so forth. For example, a polarization change may be used to indicate interaction with a transparent object.

Because of the high switching and receiving rates of the optical transmitters 402 and optical receivers 404, a large number of slices may be acquired in rapid succession. For example, the active transmitters 510 may operate with a frequency of 1 MHz allowing the capture of large numbers of slices in very short spans of time. Given these short time spans for slice capture, the system is robust in modeling rapidly moving objects, such as human gestures.

Illustrative Processes

The processes described herein may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 8:
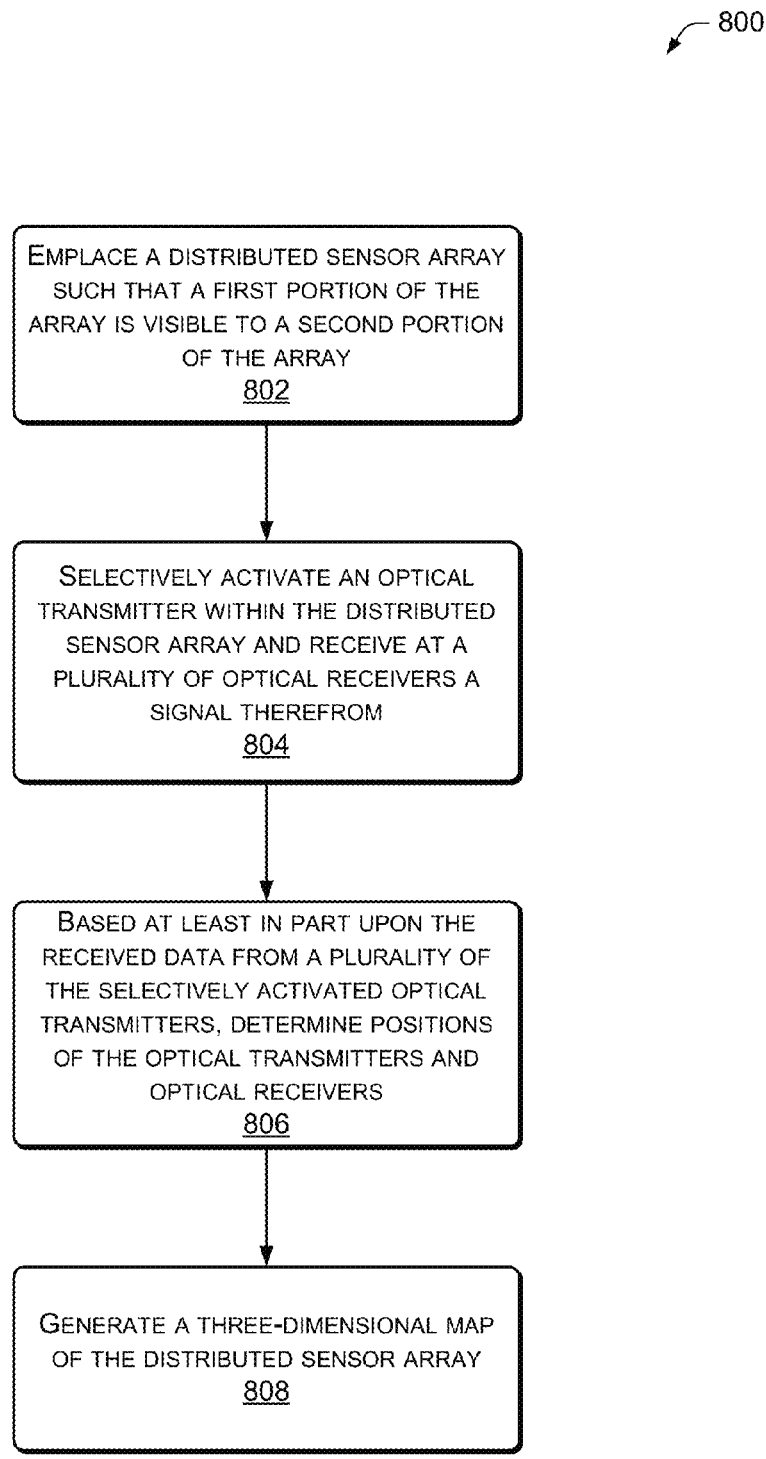
FIG. 8 is an illustrative process of calibrating the distributed sensor array using sensors within the array.

FIG. 8 is an illustrative process 800 of calibrating the distributed sensor array using sensors within the array. The relative positions of the optical transmitters 402 and optical receivers 404 may be used in the processing of slice data. These relative positions may be determined allowing for calibration of the distributed sensor array 304 using sensors on the distributed sensor array 304 itself.

At 802, the distributed sensor array 304 is emplaced such that a first portion of the array is visible to a second portion of the array. The first portion may contain the optical transmitters 402 and the second may contain the optical receivers 404. Or each portion may contain addressable transceiver nodes 406.

At 804, one of the optical transmitters 402 within the distributed sensor array 304 is selectively activated and a signal is received at a plurality of optical receivers 404. In some implementations a particular region of interest may be focused on for higher resolution or more frequent scanning. This region of interest may be determined with data from the distributed sensor array 304 or from other sensors, such as the camera 210, the ranging system 224, the microphone 218, and so forth. The system may also adjust the scanning of this area of interest to minimize or eliminate occlusion by other objects. For example, a sensor which is blocked by a plant may be removed from the scan sequence while the mirrors 411 of other addressable transceiver nodes 406 within the distributed array 304 are configured to direct rays around the obstruction.

At 806, based at least in part upon the received data from a plurality of the selectively activated optical transmitter 402, positions of the optical transmitters 402 and optical receivers 404 relative to one another may be generated. For example, a physics model describing the optical characteristics of the optical assembly 408 and transmission of the optical signal through air may allow for the correspondence of an intensity level as received at the optical receiver 404 with a particular distance. Or, the optical transmitter 402 may be configured to emit timed pulses such that time-of-flight may be used to determine a distance between the optical transmitter 402 and the optical receiver 404. By taking data from several different optical transmitters 402, the relative positions may be determined.

At 808, a three-dimensional map of the distributed sensor array 304 in the scene may be generated. This map may be used to determine the relative positions of the slices as acquired during modeling of the object.

In some implementations the calibration of the relative positions may use pre-determined information about the structure 412. For example, where the structure 412 is rigid, the distance between addressable transceiver nodes 406 may be known. Such information may thus be used in the generation of the three-dimensional map of the distributed sensor array 304.

Figure 9:
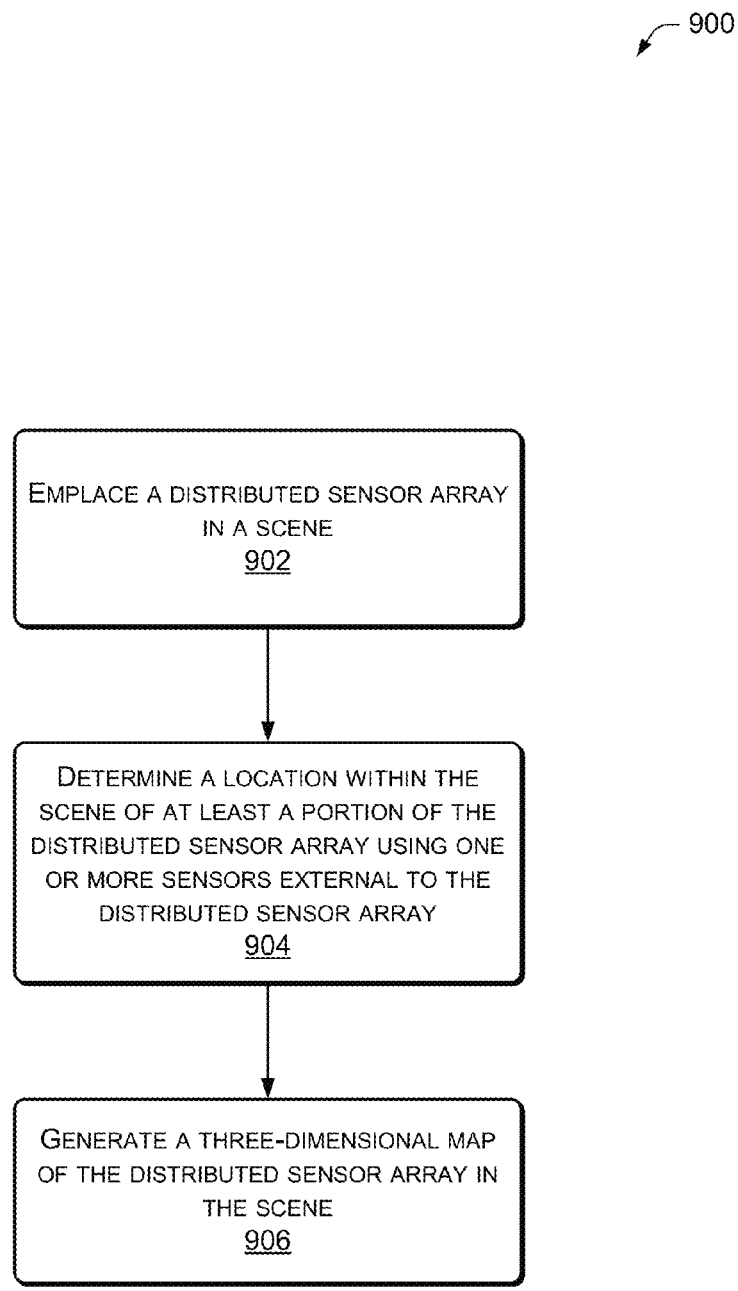
FIG. 9 is an illustrative process of calibrating the distributed sensor array using one or more sensors external to the array.

FIG. 9 is an illustrative process 900 of calibrating the distributed sensor array using one or more sensors external to the array, such as in the ARFN 102.

At 902, the distributed sensor array 304 is emplaced in the scene. At 904, a location is determined within the scene of at least a portion of the distributed sensor array 304 using one or more sensors external to the array 304. For example, the camera 210 may be configured to detect the optical tags 418. Based on the position of the camera 210, and in some implementations structured light generated by the projector 206, the location of the distributed sensor array 304 may be calculated. In another implementation, the optical transmitters 402 may generate output detectable by the camera 210 and configured such that the ARFN 102 is able to identify the particular optical transmitter 402 and its position. In still another implementation, time-of-flight data may be used to determine at least distance between addressable transceiver nodes 406.

At 906, a three-dimensional map of the distributed sensor array 304 in the scene may be generated. This map may be used to determine the relative positions of the slices as acquired during modeling of the object.

Figure 10:
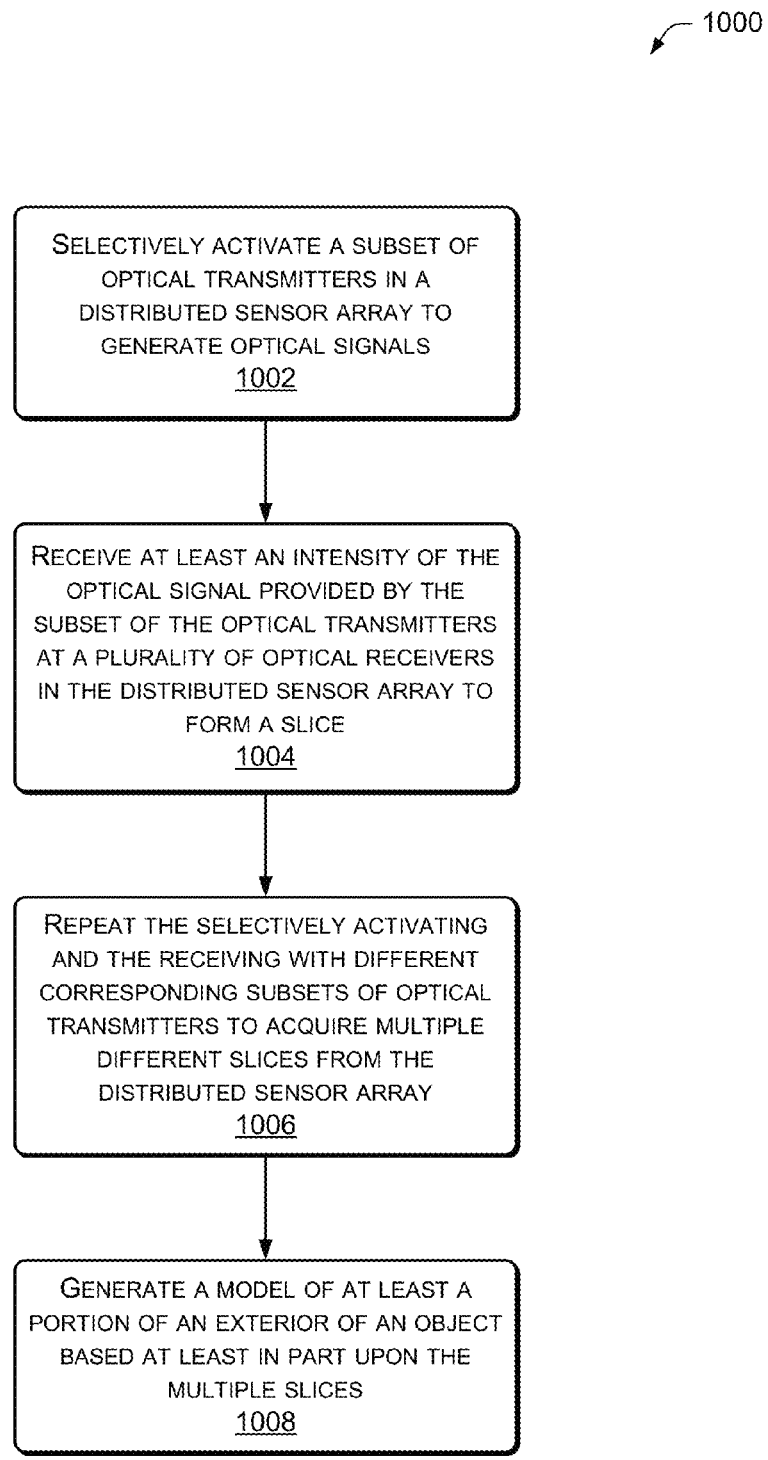
FIG. 10 is an illustrative process of detecting and modeling an object using a distributed sensor array.

FIG. 10 is an illustrative process 1000 of detecting and modeling an object using the distributed sensor array 304. At 1002, a subset of the optical transmitters 402 in the distributed sensor array 304 is selectively activated. For example, a single optical transmitter 402 may be activated and produce an optical signal.

At 1004, at least an intensity of the illumination provided by the subset of the optical transmitters 402 is received at a plurality of optical receivers 404 in the distributed sensor array 304 to form a slice 702. As mentioned above, in some implementations a plurality of optical transmitters 402 may provide illumination at substantially the same time. The illumination may be modulated to identify which received signals are associated with a given optical transmitter 402.

At 1006, the selectively activating and receiving is repeated with different corresponding subsets of optical transmitters to acquire multiple different slices from the distributed sensor array 304. For example, as described above with regards to FIGS. 5 and 6, the illuminating optical transmitter 402 may be shifted.

At 1008, a model of at least a portion of an exterior of an object based at least in part upon the multiple slices is generated. This model may be generated using the projection-slice theorem, visual hull generation techniques, shape-from-silhouette techniques, and so forth.

Conclusion

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
a processor;
a distributed sensor array coupled to the processor and comprising: (i) multiple optical transmitters, each optical transmitter of the multiple optical transmitters configured to generate an optical signal, and (ii) multiple non-imaging optical receivers;
memory, accessible by the processor;
a spatial analysis module stored in the memory and configured to:
selectively activate a subset of the multiple optical transmitters of the distributed sensor array to cause the subset of the multiple optical transmitters to generate a corresponding optical signal;
receive, by at least a subset of the multiple non-imaging optical receivers, an intensity of the optical signal provided by the subset of the multiple optical transmitters to form a slice;
selectively activate different corresponding subsets of the multiple optical transmitters to generate different corresponding signals and receive, by different corresponding subsets of the multiple non-imaging optical receivers, intensities of the different corresponding signals to acquire multiple respective slices;
generate a model of at least a portion of an exterior of an object based at least in part on the multiple respective slices; and
utilizing information associated with the object to cause an adjustment of one or more characteristics of the distributed sensor array, the adjustment including adjusting a scanning of at least one optical transmitter of the multiple optical transmitters to reduce occlusion associated with the object.

2. The system of claim 1, wherein the generating of the model comprises processing the multiple respective slices with a projection-slice theorem.

3. The system of claim 1, wherein the generating of the model comprises processing the multiple respective slices with a visual hull technique.

4. The system of claim 1, wherein the model comprises a three-dimensional model of the at least a portion of the exterior of the object.

5. The system of claim 1, wherein the subset of the multiple optical transmitters comprises a single optical transmitter.

6. The system of claim 1, wherein the multiple optical transmitters and the multiple non-imaging optical receivers operate in a non-visible light spectral band.

7. The system of claim 1, wherein the multiple optical transmitters and the multiple non-imaging optical receivers operate in a visible light spectral band.

8. The system of claim 1, wherein the multiple optical transmitters and the multiple non-imaging optical receivers operate in a spectral band which is substantially absorbed, substantially reflected, or both from the object.

9. The system of claim 1, wherein the intensity of the optical signal is affected by interference or diffraction of light by the object.

10. The system of claim 1, wherein the multiple optical transmitters and the multiple non-imaging optical receivers are configured to transmit and receive signals, respectively, with a wide-angle field of view of at least four steradians.

11. The system of claim 1, wherein the distributed sensor array further comprises one or more mirrors configured to direct at least a portion of the optical signals.

12. The system of claim 1, wherein the distributed sensor array is emplaced such that a first portion of the array is visible to a second portion of the distributed sensor array.

13. The system of claim 1, further comprising a calibration module stored in the memory and configured to determine relative positions of the multiple optical transmitters and the multiple non-imaging optical receivers in the distributed sensor array.

14. The system of claim 1, wherein the multiple optical transmitters comprise light fixtures configured to also provide general illumination.

15. The system of claim 1, wherein at least a portion of the distributed sensor array is configured to move during selective activation of the optical transmitters.

16. The system of claim 1, further comprising a sensor configured to detect an object and wherein the spatial analysis module is further configured to alter the selective activation of the subset of the multiple optical transmitters of the distributed sensor array at least partly in response to the detection.

17. One or more non-transitory computer-readable media storing computer-executable instructions that, when executed, cause one or more processors to perform acts comprising:
selectively activating an optical transmitter in a distributed sensor array that includes a plurality of optical transmitters and a plurality of non-imaging optical receivers;
receiving at the plurality of non-imaging optical receivers a signal from the optical transmitter, wherein the signal is modified by interaction with an object or unmodified after bypassing the object, to form a slice;
selectively activating different optical transmitters of the plurality of optical transmitters and receiving a different signal from a different non-imaging optical receiver of the plurality of non-imaging optical receivers to acquire multiple different slices;
generating a model of the object based at least in part on the multiple different slices;
determining a region of interest associated with the object; and
adjusting a scanning of at least one optical transmitter in the distributed sensor array to reduce occlusion within the region of interest by the object.

18. The one or more non-transitory computer-readable storage media of claim 17, wherein the generating the model comprises processing the multiple different slices with a projection-slice theorem.

19. The one or more non-transitory computer-readable storage media of claim 17, wherein the optical transmitter and the plurality of non-imaging optical receivers are configured to operate in a visible-light spectral band.

20. The one or more non-transitory computer-readable storage media of claim 19, wherein the plurality of optical transmitters are configured to be illuminated more than 120 times per second.

21. The one or more non-transitory computer-readable storage media of claim 17, the acts further comprising supplementing the model of the object with structured light data.

22. The one or more non-transitory computer-readable storage media of claim 17, further comprising selectively activating a light fixture to generate the optical signal for reception at the plurality of non-imaging optical receivers.

23. The one or more non-transitory computer-readable storage media of claim 17, further comprising directing a plurality of dynamic mirrors to direct at least a portion of the optical signal to one or more of the plurality of non-imaging optical receivers.

24. A method comprising:
detecting an object within an environment;
selectively activating an optical transmitter of one or more optical transmitters in a distributed sensor array that includes the one or more optical transmitters and one or more non-imaging optical receivers;
causing the optical transmitter to generate a signal that is directed to a location within the environment that is associated with the object;
receiving, at an non-imaging optical receiver of the one or more non-imaging optical receivers, the signal, the signal being modified by interaction with the object or unmodified after bypassing the object, to form a slice;
determining information associated with the object; and
causing an adjustment of one or more characteristics of the distributed sensor array based at least partly on the information associated with the object, the adjustment including adjusting a scanning of the optical transmitter to reduce occlusion associated with the object.

25. The method as recited in claim 24, further comprising:
selectively activating a different optical transmitter of the one or more optical transmitters to generate a different signal; and
receiving, by the different optical transmitter of the one or more optical transmitters, the different signal to acquire multiple different slices.

26. The method as recited in claim 25, further comprising generating a model of the object based at least in part on the multiple different slices.

27. A system comprising:
a processor;
a distributed sensor array coupled to the processor and comprising: (i) multiple optical transmitters that are configured to generate an optical signal, and (ii) multiple non-imaging optical receivers;
memory, accessible by the processor;
a spatial analysis module stored in the memory and configured to:
detect an object within the system;
selectively activate an optical transmitter of the multiple optical transmitters to cause the optical transmitter to direct a signal towards a location associated with the object;
receive the signal to form a slice;
selectively activate a different optical transmitter of the multiple optical transmitters and receive a different signal to acquire multiple respective slices; and
causing an adjustment of one or more characteristics of the distributed sensor array based at least partly on information associated with the object, the adjustment including adjusting a scanning of the optical transmitter to reduce occlusion associated with the object.

28. The system as recited in claim 27, wherein the spatial analysis module is further configured to generate a model of at least a portion of an exterior of the object based at least in part on the multiple respective slices.

29. The system as recited in claim 27, wherein the model includes a two-dimensional model or a three-dimensional model of the at least the portion of the exterior of the object.

30. The system as recited in claim 27, wherein the causing the adjustment of the one or more characteristics of the distributed sensor array includes causing an increase of the scanning of the optical transmitter based at least partly on information associated with the object.

31. The system as recited in claim 27, wherein the causing the adjustment of the one or more characteristics of the distributed sensory array includes causing an increase in resolution associated with the optical transmitter.

* * * * *